(12) United States Patent
Lehmker et al.

(10) Patent No.: US 6,481,096 B2
(45) Date of Patent: Nov. 19, 2002

(54) APPARATUS FOR ASSEMBLING A THREE-DIMENSIONAL STRUCTURAL COMPONENT

(75) Inventors: Joachim Lehmker, Lunestedt (DE); Karl-Heinz Muehlnickel, Jork (DE); Udo-Henning Stoewer, Bremen (DE); Ruediger Vollmerhaus, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/919,388

(22) Filed: Jul. 31, 2001

(65) Prior Publication Data

US 2001/0054228 A1 Dec. 27, 2001

Related U.S. Application Data

(62) Division of application No. 09/603,870, filed on Jun. 26, 2000, now Pat. No. 6,408,517.

(30) Foreign Application Priority Data

Jun. 26, 1999 (DE) .......................... 199 29 471

(51) Int. Cl.[7] ................................ B23P 21/00
(52) U.S. Cl. .................... 29/721; 29/714; 29/281.1; 29/281; 29/897.2; 29/407.1; 29/559
(58) Field of Search .............. 29/897.3, 897.2, 29/897.32, 897, 423, 429, 466, 467, 469, 33 K, 56.6, 281.1, 281.6, 281.3, 559, 709, 711, 712, 714, 720, 721, 795, 791, 407.09, 407.1; 269/47, 17, 296, 58

(56) References Cited

U.S. PATENT DOCUMENTS 2,117,435 A * 5/1938 Langstroth
2,378,043 A * 6/1945 Sorensen et al.
2,594,586 A * 4/1952 Ries
2,928,535 A * 3/1960 Simmons et al.
3,194,525 A * 7/1965 Webb
3,612,484 A * 10/1971 Gallagher
4,259,776 A   4/1981 Roda
4,462,535 A * 7/1984 Johnston et al.
4,662,556 A * 5/1987 Gidlund
5,645,389 A * 7/1997 Lilja et al.
5,694,690 A  12/1997 Micale
6,170,141 B1 * 1/2001 Rossway et al.

FOREIGN PATENT DOCUMENTS

DE  3438584   5/1985
FR  2702982   9/1994
FR  2788743   7/2000

* cited by examiner

Primary Examiner—S. Thomas Hughes
Assistant Examiner—T. Nguyen
(74) Attorney, Agent, or Firm—W. F. Fasse; W. G. Fasse

(57) ABSTRACT

Three-dimensional large scale bodies such as jumbo aircraft fuselages (14) are assembled in body sections around a central longitudinal assembly core (1) which itself is mounted at its ends and accessible all around along its length. Robots carrying tools for holding, transporting and precisely positioning pre-assembled wall shell sections, are movable along the central core (1). First, at least one floor grid (2 or 3) is releasably mounted to the core. Then, side wall shell sections (4, 5) are secured to the floor grids. Then, top and bottom wall shell sections (10, 8) are secured to the side wall shell sections (4, 5) to form a body section (BS) of the large scale body (14). Neighboring body sections are secured to each other along cross-seams. Upon completion, the floor grids are released from the core (1) and the core is removed preferably withdrawn longitudinally from the assembled large component or body.

7 Claims, 4 Drawing Sheets

APPARATUS FOR ASSEMBLING A THREE-DIMENSIONAL STRUCTURAL COMPONENT

CROSS-REFERENCE TO RELATED APPLICATION

This application is a Divisional Application of U.S. application Ser. No. 09/603,870, filed Jun. 26, 2000 now U.S. Pat. No. 6,408,517.

This application is based on and claims the priority under 35 U.S.C. §119 of German Patent Application 199 29 471.2, filed on Jun. 26, 1999, the entire disclosure of which is incorporated herein by reference.

FIELD OF THE INVENTION

The invention relates to an apparatus for producing large three-dimensional structural components such as an aircraft fuselage or the like having an elongated barrel-shaped configuration or an oval or circular cross-section.

BACKGROUND INFORMATION

So-called large volume or jumbo aircraft have fuselages assembled from shell sections, preferably shell sections reinforced by load supporting elements such as stringers and spars or ribs. One or more plate-shaped floor grids are mounted inside such large scale fuselages. The floor grids extend longitudinally inside the fuselage and from one side wall to the opposite side wall.

German Patent Publication DE 34 38 584 A1 discloses an apparatus for the manufacture of an aircraft fuselage, whereby large surface area, curved structural elements are assembled to form fuselage sections. These fuselage sections are then interconnected by an automatically operating orbital riveting machine and by manual labor to form fuselage components. The riveting takes place along so-called cross-seams, whereby the automatic orbital riveting machine travels along these cross-seams guided by a machine guide rail extending as a ring around the aircraft body or fuselage. The entire orbital riveting machine or system is mounted on a carriage that can travel along or rather in parallel to the longitudinal aircraft axis also referred to as the X-axis.

In the manufacture of aircraft fuselages, it is further known to assemble subassemblies in rigid jigs that determine the geometry of the subassembly. Such rigid jigs operate on the principle of orienting all subassemblies relative to a zero position in a rigid system. According to such a known system, the preassembled subassemblies are deposited in jigs and located relative to fixed system points with a so-called zero alignment. Such a zero alignment system has the disadvantages that the zero alignment can result in deviations, particularly along the interface between individually neighboring subassemblies. Such deviations can fall outside permissible tolerance ranges. Moreover, an adjusting of the individual subassemblies in order to assure the desired overall geometry of the aircraft fuselage is not possible. However, as long as the fuselage has a circular cross-section that is a cylindrical configuration, the use of the zero alignment or positioning is possible, whereby the subassemblies forming the lower body half are positioned and riveted first whereupon the cabin floor is inserted and connected with the spars or ribs of the lower body half. A so-called auxiliary carrier, also referred to as a presenting frame, holds the subassembly relative to the jig and tool system in position without any possibility of making compensating adjustments in the positioning. Thus, positional deviations of the floor structure relative to the fuselage body are possible, but cannot be corrected. Once the floor structure and the lower fuselage half are assembled, the upper side wall shell sections and upper shell sections are secured to the lower half, whereby the positioning is again performed by way of the above-mentioned zero alignment.

Efforts have been made for avoiding some of the above described drawbacks. Thus, U.S. Pat. No. 5,694,690 (Micale) describes a method for producing large scale aircraft bodies from a plurality of subassemblies, whereby the subassemblies or selected components of the subassemblies are provided with drilled coordination holes for an accurate positioning and assembly of the subassemblies. The coordination holes make sure that the elements of the subassembly are already accurately positioned relative to each other so that the resulting subassemblies become self-locating and thus intrinsically determine the final contour of the aircraft body independently of tooling. The drilling of the coordination holes is accomplished by a computer controlled precision robot which is directed to the drilling locations using a digital data set taken directly from original digital part definition records.

The above described methods leave room for improvement, especially with regard to reducing the assembly costs while still assuring the required accuracy in the configuration of the final large scale product, such as a fuselage for a jumbo aircraft.

OBJECTS OF THE INVENTION

In view of the above it is the aim of the invention to achieve the following objects singly or in combination:

- to provide an assembly apparatus for producing large scale components such as jumbo aircraft bodies, whereby the assembly permits maintaining required, precise tolerance ranges without the need for high precision jigs and without drilling precisely positioned locating holes, while still assuring the accuracy of the three-dimensional large scale body;
- to substantially increase the accessibility of tools to the assembly positions for performing most assembly work by robots, particularly the forming of longitudinal and cross-seams; and
- to provide a system and apparatus which substantially is independent of the length of the large scale body so that substantially any required number of subassemblies can be jointed to each other without any additional matching adjustments so that an entire aircraft fuselage can be assembled.

SUMMARY OF THE INVENTION

The above objects have been achieved by performing the following steps with the aid of the apparatus according to the invention. A prefabricated longitudinal central assembly core is mounted at its ends, for example between support columns. Then, at least one floor grid is secured to the assembly core with the aid of clamping tools which mechanically fasten the floor grid to the core. Then, shell-shaped sections having a defined internal stiffness of their own are positioned by robot tools which are preferably computer controlled, sequentially around the central assembly core and then mechanically interconnected, for example by riveting. The positioning is performed in such a way that first side wall shell sections are positioned opposite one another and secured to the floor grid or grids by mechanical means. Thereafter, bottom shell sections and top shell sections are sequentially secured to the side shells and to one another to form individual body sections of the large body such as a fuselage which is then completed by interconnecting individual body sections to each other, for example by riveting along cross-seams.

It is an important advantage of the invention that the assembly of the prefabricated shell sections or subsections can take place within a precise tolerance range, whereby, for example an aircraft fuselage section can be assembled with the required precision, yet without jigs or locating holes. All prefabricated subsections are positioned relative to the central prefabricated core which itself is lightweight and has its own stiffness. The core forms part of the assembly station and can be reused. The prefabricated fuselage planking is mounted to the floor grid or to the floor grids held in precise positions by the central longitudinal assembly core. By first mounting the side wall shell sections to the floor grid or grids, it becomes possible to mount or assemble the bottom fuselage shell section and the top shell section to the side shells without any difficulties. In a preferred form, the side wall shells are first secured to the floor grid or grids in a row, whereupon the upper and lower shells can also be secured in respective rows to the row of side wall shells.

According to a preferred embodiment of the present method, the three-dimensional large structural component is assembled of at least two body sections which are interconnected by the above-mentioned cross-seam, whereby each individual body section is so formed that the lateral or side shells are positioned opposite each other and are mechanically connected to the floor grid or grids to form a first subsection. Then the respective upper and/or lower shells are mechanically connected to the two side wall shells to form the first body section. Once the first body section is assembled the second section is assembled in the same manner and further sections are assembled next to the already assembled sections. Each body section is mechanically connected, e.g. by riveting, to the preceding body section along the cross-seams.

The apparatus according to the invention comprises a combination of the following features. An elongated central assembly core for holding at least one or more floor grids is secured with one end to a mounting held for example in a column, while the other end of the core is secured to a second mounting. Both mountings hold the core in a precise position relative to the longitudinal axis of a large scale body to be assembled. Tool means in the form of movable robots are provided for positioning body shell sections relative to the assembly core and relative to each other. A central processing unit is operatively connected to the tool means for controlling the tool means when they perform a holding, transporting and positioning operation for the assembly of shell sections relative to the floor grid or grids held by the core, whereupon additional tools perform the securing operations.

When the assembly is completed, the large scale body is supported by other supports, the central assembly core is released from the floor grids and removed from the body, for example by pulling the core longitudinally out of the body.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1A:
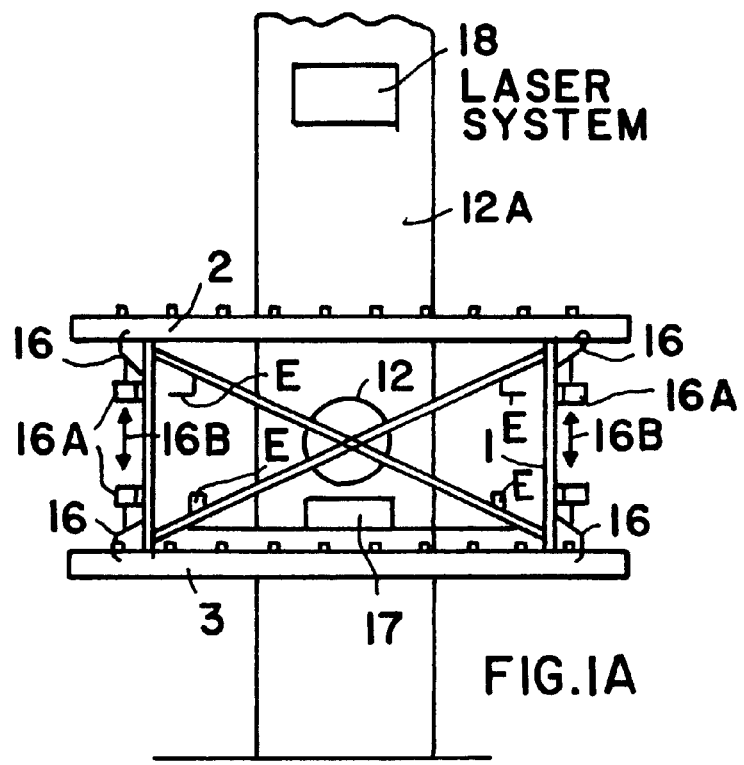
FIGS. 1A to 1D are views substantially in the direction of the arrow I in FIG. 2, illustrating a sequence of steps according to the invention in the assembly of a large structural component such as a jumbo aircraft fuselage having two floors and an oval cross-section.

FIG. 1A illustrates the first stage in which a central longitudinal assembly core 1 is secured with its far end to a mounting 12 forming part of a mounting column 12A. The opposite end of the core 1 is held in place by a further mounting part 13 of a mounting column 13A to be described below with reference to FIG. 2. The central axis of the assembly core 1 extends in the direction of the central longitudinal axis of an aircraft fuselage not shown in FIG. 1. Preferably, the assembly core 1 has a rectangular cross-section. An upper floor grid 2 and a lower floor grid 3 are mechanically secured in a releasable manner by symbolically shown-clamping tools 16 driven by clamp drives 16A which in turn are controlled by a computer 17. A laser distance measuring system 18 is positioned for measuring any deviation of the core 1 from standard dimensions stored in the memory of the computer 17. The clamping tools 16 are adjustable by the clamp drives 16A in the Z-direction of the aircraft, namely up and down as indicated by the arrows 16B. By adjusting the position of the clamps 16 in the Z-direction, it is possible to compensate any shape and dimension variations in the central assembly core 1, for example when the core 1 should be bent in the Z-direction between its two supported ends. Thus, it is advantageously possible to compensate also for any dimensional deviations in the individual fuselage shell sections forming body sections of the fuselage. The above-mentioned laser system 18 is conventional and capable of measuring the bending and/or dimensional deviations in a contactless manner.

Figure 1B:
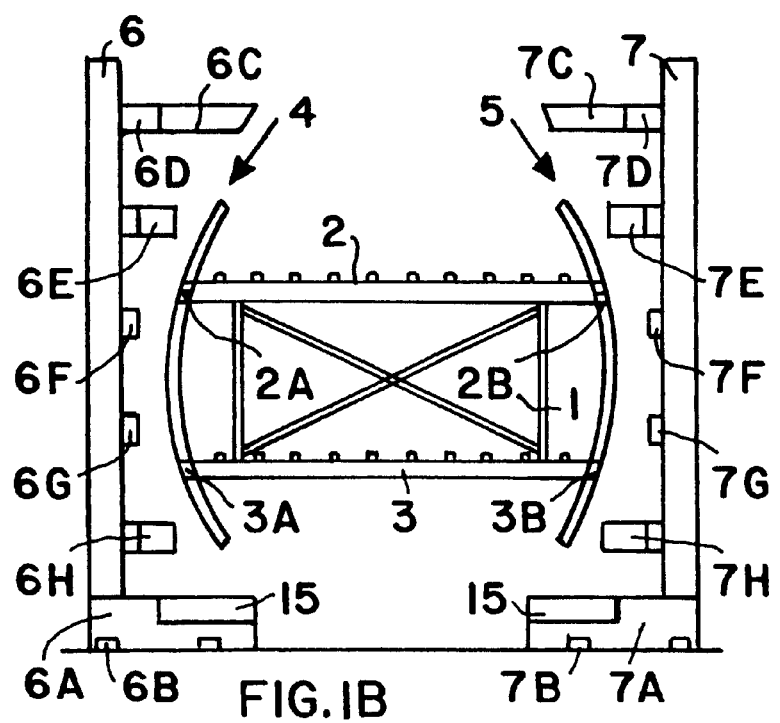

FIG. 1B shows a view similar to that of FIG. 1A, but now illustrating the second stage of assembly with the help of robot tool means 6 and 7 supported on carriages 6A and 7A movable in parallel to the longitudinal aircraft axis on rollers 6B and 7B. Each robot tool 6 and 7 carries respective tools 6C, 7C driven by individual drive elements 6D and 7D. Additional tools 6E, 6F, 6G, 6H and 7E, 7F, 7G, 7H are symbolically shown in FIG. 1B for holding and positioning wall shell sections 4, 5, 8, 10. All robot tools 6, 7 and their individual tools are operated under the control of computers 15. The drives for the carriages 6A, 7A are also computer controlled. The robot tools are of conventional construction and capable of holding, transporting and precisely positioning shell sections 4 and 5 which are side wall sections of the fuselage for connection to the floor grids 2 and 3 and bottom shells 8 as well as top shells 10 to the side wall sections (4, 5). As shown in FIG. 1B, the side wall shell sections 4 and 5 are mechanically connected to the upper floor grid 2 at 2A and 2B and to the lower floor grid 3 at 3A and 3B. The elongated holding and positioning tools 6C, 7C shown in FIG. 1B are capable of holding a top shell section 10 shown in FIG. 1D to be described in more detail below. All operations are computer controlled.

Figure 1C:
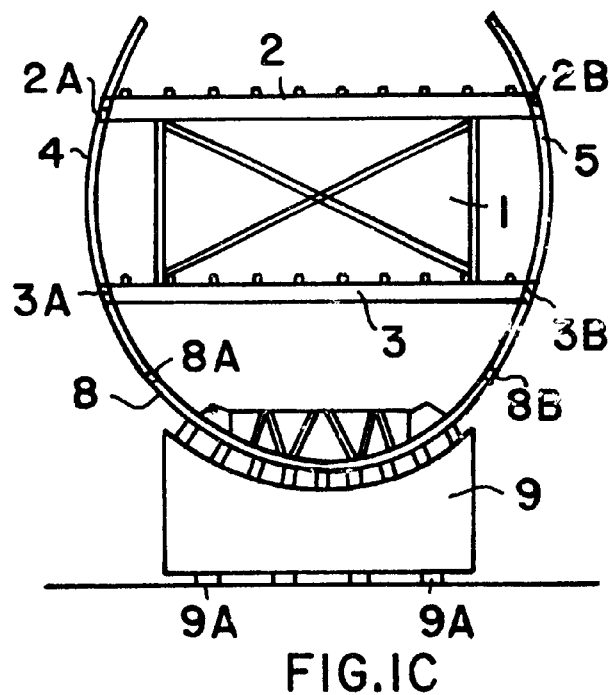

FIG. 1C shows the third assembly stage according to the present method in which a bottom wall shell section 8 transported by a robot carriage 9 with rollers 9A driven by drives 9B, is secured to the side wall sections 4 and 5 at 8A and 8B. All the connections between the subsections are conventional. The carriage 9 and its components are also part of the robot system which is controlled by programs stored in a memory of computers 15.

Figure 1D:
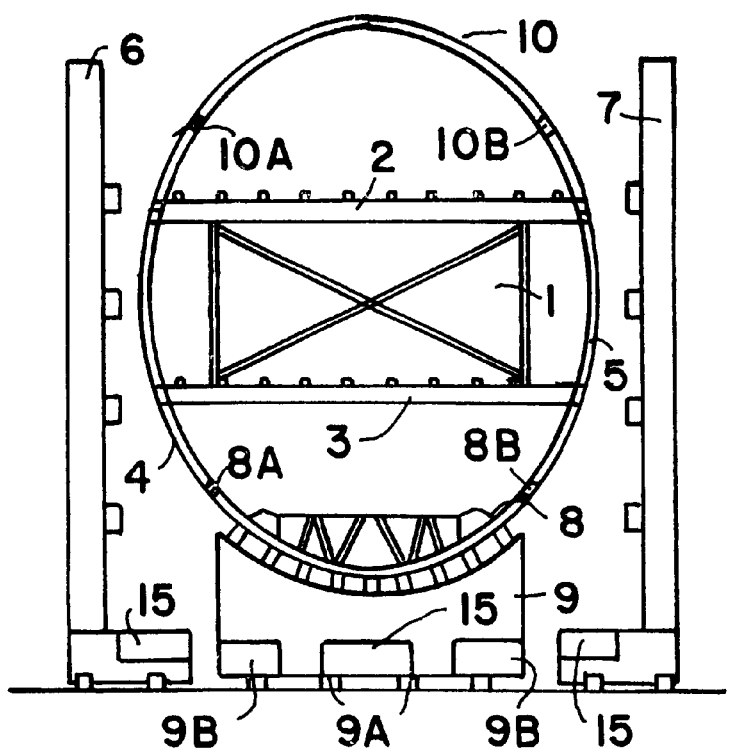

FIG. 1D shows the fourth stage of the present method in which an upper wall shell section 10 has been secured to the side sections 4 and 5 at 10A and 10B. As mentioned, the tools 6C and 7C of the robots 6 and 7 are capable of holding and positioning the top sections 10 relative to the side sections 4 and 5. With the completion of the fourth assembly stage one body section BS of an aircraft body 14, see FIG. 2, is completed.

Figure 2:
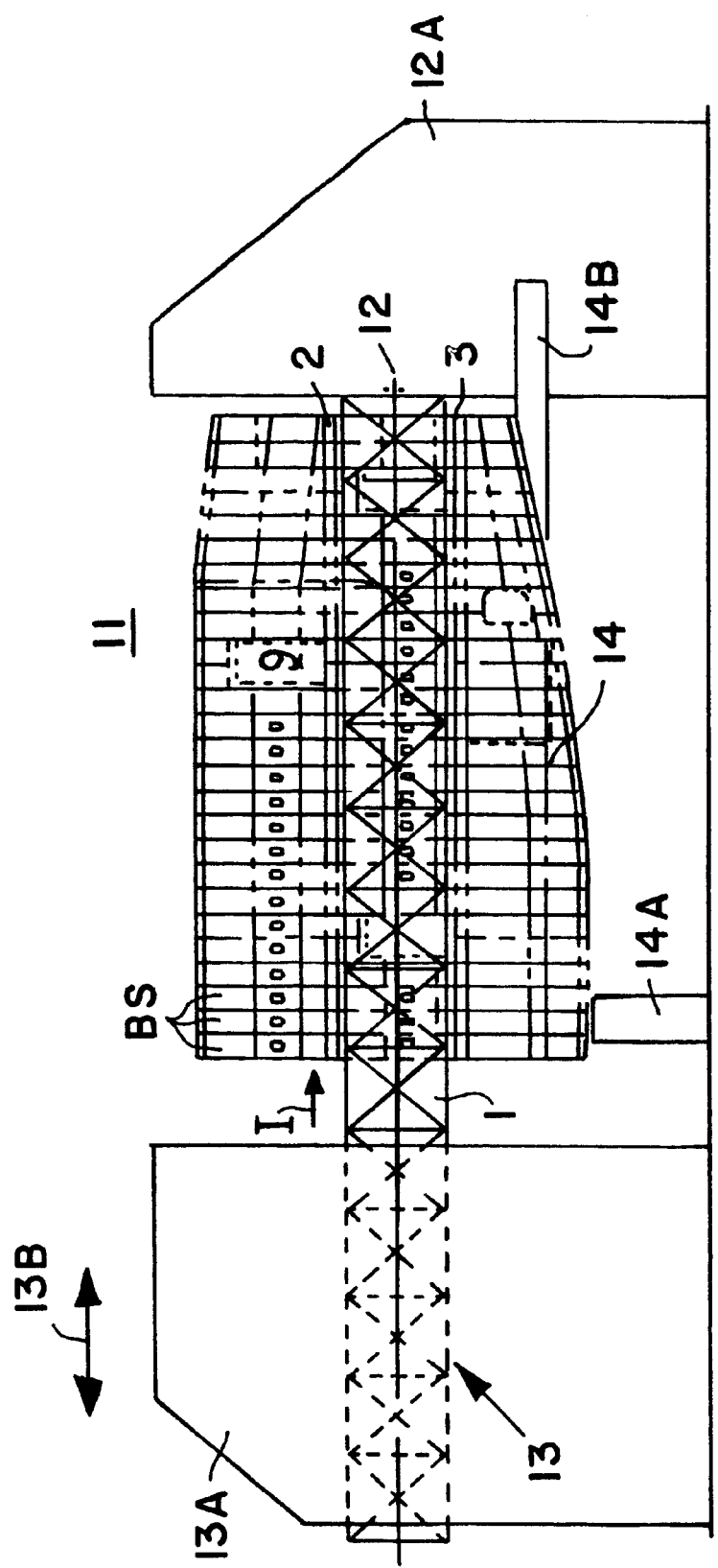
FIG. 2 is a side view of the present assembly station perpendicularly to the longitudinal or X-axis of the aircraft showing a plurality of assembled body sections.

Referring to FIG. 2 the central assembly core 1 forms the basic component of the apparatus of the invention for the performance of the present method in the assembly of a large structural component, for example the fuselage of a jumbo aircraft. The assembly core 1 is equipped with elements E for supporting supply conduits such as electrical conductors, compressed air ducts for the operation of tools and power supplies for illuminating purposes as well as tool carriers. The assembly core 1 is preferably so constructed that it is capable to carry either one floor grid structure for a freight loading space or one floor grid structure for a passenger deck or the core 1 may carry two floor grids 2 and 3 for two passenger decks of a multi-deck jumbo aircraft fuselage 14 shown in FIG. 2.

The mounting columns 12A and 13A with their mountings 12 and 13 are so constructed that the central core 1, once mounted, is accessible all around between the core ends, because the core 1 is mounted only at its ends so that the lateral bottom and top shell wall sections 4, 5 and 8, 10 can be mounted without any access problems. The maintaining of the proper curvature and of the correct positioning of the prefabricated wall shell sections 4, 5, 8 and 10 relative to the central core 1 is assured by the computer controlled robot system 6, 7 and 9, whereby the computers 15 and 17 control the holding, transporting and positioning of the wall shell sections. The alignment of the wall shell sections 4, 5 and 8, 10 to be connected to the shell sections 4 and 5 is accomplished with the aid of the contactless laser measuring system 18 that provides its information to the computers 15 and 17 which control all the tools drives. For example, the tool drives 6D and 7D assure the proper positioning of the tools 6C and 7C and thus of the top shell section 10. The same applies to the positioning of the carriage 9 with the bottom section 8 and to the other tools 6E to 6H and 7E to 7H and their respective drives.

The most important advantage of the present system is seen in that the finished product, such as a jumbo aircraft body 14, does satisfy the required high precision tolerances because the assembly of the individual sections already satisfies fine tolerances assured by the laser controlled positioning of the individual wall shell sections 4, 5, 8 and 10.

It is also advantageous to preassemble the wall sections 4, 5, 8 and 10 so that their outer contour curvature and geometry conform to the theoretically correct position within the shell of the whole body 14 relative to the zero axis of the system, for example relative to the central longitudinal axis of the assembly core 1 and of the aircraft body 14. The correct curvature and geometry of the contour curvature of the shell wall sections 4, 5, 8 and 10 is already assured by the preassembly of these sections and the present assembly sequence maintains the correct curvature and geometry.

Further, the wall shell sections have an adequate inherent stiffness so that these sections will conform to the designed aircraft contour. More specifically, the inherent stiffness of the sections is sufficient if the sections do not change their outer contour during the assembly by the present computer controlled robot carrier and positioning system.

The apparatus according to the invention shown in FIG. 2 in a side view includes the above-mentioned mounting 12 for example in the form of a clamping device 12 carried by column 12A for holding one end of the assembly core 1. The other end is mounted to the above-mentioned mounting 13 in the form of a clamping and guide column 13A provided with a core clamping and guide mechanism 13. The core clamping and guide mechanism 13 permits withdrawing the core 1 from the assembled fuselage or body 14, which upon completion rests on supports 14A and 14B so that the core 1 may be withdrawn by the core clamping and guide mechanism 13 to the left in FIG. 2. This clamping and guide mechanism 13 can position the core as indicated by the double arrow 13B. The above described transporting holding and positioning robots 6 and 7 with their respective tools are part of the mounting station 11. However, these robots 6 and 7 are not shown in FIG. 2. These robots are movable alongside the core 1 of the station 11 shown in FIG. 2 as indicated by the double arrow 13B to transport, hold and position the wall shell sections 4, 5, 8 and 10 as described above with references to FIGS. 1A to 1D.

As soon as the fuselage 14 is completed the supports 14A and 14B are moved into position for the removal of the core 1. Prior to the removal, the above described computer controlled clamping tools 16, 16A are released from the floor grids 2 and 3, whereupon the core 1 can be moved to the left by the guide mechanism 13. For this purpose it is advantageous if the clamping tools 16 are driven by their tool drive 16A as indicated by the arrows 16B to provide sufficient clearance between the tools that are mounted to the core 1 for holding or clamping the floor grids 2 and 3.

FIGS. 3A, 3B, 3C and 3D also illustrate the sequence of assembly steps according to the invention, however, in a perspective illustration.

Figure 3A:
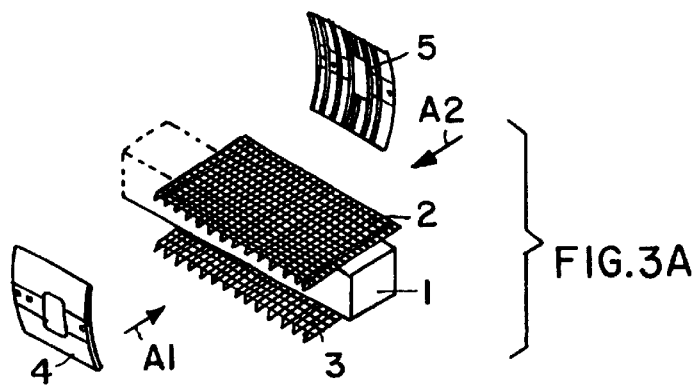
FIGS. 3A to 3D show perspective, partly exploded views of the sequential assembly steps, whereby the assembly progresses from FIG. 3A to FIG. 3D.

FIG. 3A shows that the floor grids 2 and 3 have been secured to the assembly core 1 and the side wall shell sections 4 and 5 are ready for positioning and securing to the grids 2 and 3. For this purpose the robots, or rather the robot tools move the side wall sections 4 and 5 in the directions of the arrows A1 and A2 toward the grids 2 and 3.

Figure 3B:
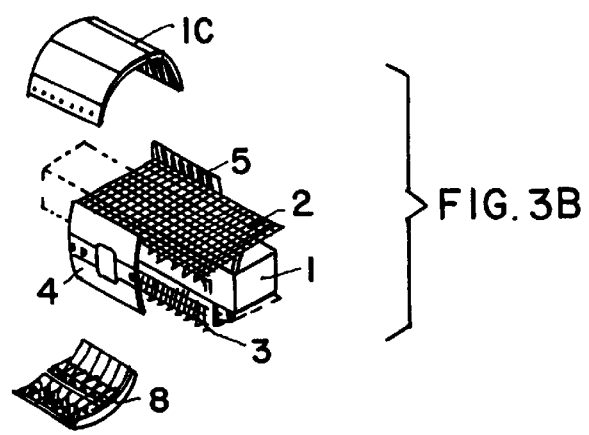

FIG. 3B shows that the side wall sections 4 and 5 have been secured to the grids 2 and 3. Next, a top wall shell section 10 is moved into position for securing to the side wall sections 4 and 5. Next, a bottom wall shell section 8 is moved into position by the carriage 9 for attachment to the grids 2 and 3.

Figure 3C:
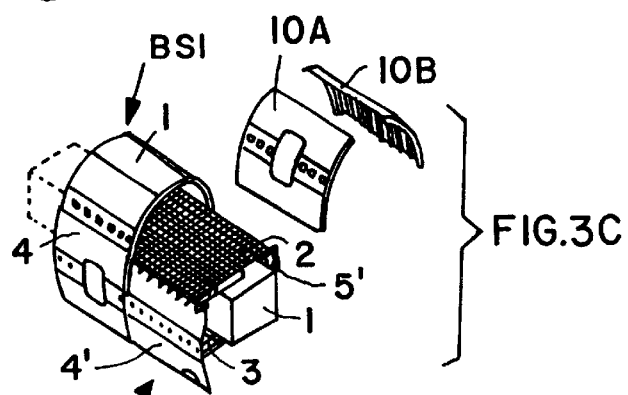
Figure 3D:
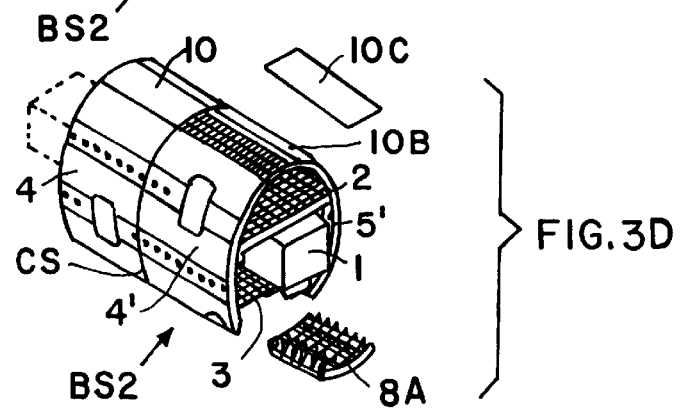

FIG. 3C shows that one fuselage or body section BS1 is completed. The next fuselage section BS2 has its side wall panel 4' already secured to the grids 2 and 3. The opposite side wall sections 5' has also been secured to the grids 2 and 3. The top wall shell section of the body section BS2 differs from the top section 10 in that the second top wall shell section includes three components 10A, 10B and 10C. The components 10A and 10B are connected to the respective side wall sections 4' and 5' whereupon, as shown in FIG. 3D the central top component 10C is secured to the two other top components 10A and 10B. The bottom section 8A is then positioned and secured to the lower edges of the side sections 4' and 5' as described, to form the second fuselage section FS2. The steps are then repeated for the formation of further body sections BS to form the fuselage.

Once the two body sections BS1 and BS2 are assembled as described, the sections are secured to each along a cross-seam CS shown in FIG. 3D, for example by riveting robot tools. From the just described assembly of the fuselage section BS2 it is clear, that the individual wall shell sections may be further divided into a plurality of components as shown for the top section 10 divided into three components 10A, 10B and 10C.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for assembling at least one body section (BS) of a structural component (14) including a plurality of wall shell sections (4, 5, 8, 10) and at least one floor grid (2 or 3), said apparatus comprising: an elongated central assembly core (1) for holding at least one said floor grid, a first mounting (12) for holding one end of said elongated central assembly core (1) outside said at least one body section, a second mounting (13) for holding an opposite end of said elongated central assembly core (1) outside said at least one body section, tool means (6, 7, 9, 16) for holding, transporting and positioning said wall shell sections relative to said elongated central assembly core (1) and relative to each other, at least one central processing unit (15, 17) operatively connected to said tool means (6, 7, 9, 16) for controlling said tool means, and wherein said first and second mountings outside said at least one body section provide access for said tool means to said at least one body section for forming longitudinal seams and cross seams in said at least one body section.

2. The apparatus of claim 1, wherein said tool means comprise first and second carriages (6, 7) for movement alongside said assembly core, each of said carriages comprising tools (6C, 7C . . . ) for holding said wall shell sections (4, 5), drives (6D, 7D . . . ) for operating said tools for holding, transporting and positioning said wall shell sections (4, 5).

3. The apparatus of claim 2, wherein said tools comprise holding element extensions for holding top wall shell sections (10).

4. The apparatus of claim 2, further comprising a third carriage (9) for transporting and positioning bottom wall shell sections (8) of said body section, and drive means (9A, 9B) for moving said third carriage (9) longitudinally in parallel to said elongated assembly core (1).

5. The apparatus of claim 1, wherein said elongated assembly core (1) comprises clamping elements (16) for releasably securing said at least one floor grid (2, 3) to said elongated assembly core, clamp drive means (16A) for operating said clamping elements and a computer (17) for controlling through said clamp drive means (16A) an operation of said clamping elements (16).

6. The apparatus of claim 5, further comprising a laser system (18) for measuring positional deviations of said elongated assembly core (1) and of dimensional deviations of said sections (4, 5) for producing respective input signals for said computer (17) which provides control signals for said clamp drives to compensate said positional deviations and said dimensional deviations by respectively adjusting said clamps.

7. The apparatus of claim 1, wherein said elongated assembly core (1) comprises elements (E) for carrying any one of supply conduits, electrical conductors, illumination devices, and tool supports.

\* \* \* \* \*